United States Patent
Lopez

(10) Patent No.: US 11,987,176 B1
(45) Date of Patent: May 21, 2024

(54) VEHICLE ELECTRONIC DISPLAY

(71) Applicant: Reynaldo Lopez, Weston, FL (US)

(72) Inventor: Reynaldo Lopez, Weston, FL (US)

(73) Assignee: Lopsun, Weston, FL (US)

( * ) Notice: Subject to any disclaimer, the term of this patent is extended or adjusted under 35 U.S.C. 154(b) by 0 days.

(21) Appl. No.: 18/119,453

(22) Filed: Mar. 9, 2023

Related U.S. Application Data

(60) Provisional application No. 63/318,336, filed on Mar. 9, 2022.

(51) Int. Cl.
| | | |
|---|---|---|
| H04N 23/50 | (2023.01) | |
| B60Q 1/00 | (2006.01) | |
| B60Q 1/50 | (2006.01) | |

(52) U.S. Cl.
CPC ......... *B60Q 1/5035* (2022.05); *B60Q 1/0023* (2013.01); *B60Q 1/0088* (2013.01); *H04N 23/50* (2023.01)

(58) Field of Classification Search
CPC .. B60Q 1/5035; B60Q 1/0023; B60Q 1/0088; H04N 23/50
USPC .......................................................... 348/148
See application file for complete search history.

(56) References Cited

U.S. PATENT DOCUMENTS

| | | | | |
|---|---|---|---|---|
| 7,020,992 B1* | 4/2006 | Christie | ................. | G09F 21/04 |
| | | | | 40/593 |
| 8,520,070 B1* | 8/2013 | Englander | .............. | G06V 20/56 |
| | | | | 348/148 |
| 8,558,756 B2 | 10/2013 | Stevens et al. | | |
| 8,738,101 B1* | 5/2014 | Myr | ..................... | H04M 1/0214 |
| | | | | 379/330 |
| 8,823,640 B1* | 9/2014 | Harris | ................... | G06F 3/1462 |
| | | | | 345/173 |
| 8,875,426 B2* | 11/2014 | Wagner | ..................... | G09F 9/33 |
| | | | | 40/446 |
| 9,007,431 B1* | 4/2015 | Kozko | ................... | H04N 23/69 |
| | | | | 348/38 |
| 9,608,956 B2 | 3/2017 | Sawato | | |
| 9,734,744 B1 | 8/2017 | Mcgie | | |
| 10,371,196 B1* | 8/2019 | Zaloom | ................. | F16M 11/38 |
| 10,810,621 B2 | 10/2020 | Falconer et al. | | |
| 10,829,038 B1* | 11/2020 | Lara Contreras | ... | G09F 21/0485 |
| 2001/0022719 A1* | 9/2001 | Armitage | .............. | G06F 1/1626 |
| | | | | 361/679.17 |

(Continued)

FOREIGN PATENT DOCUMENTS

CA 2806071 A1 * 8/2013

*Primary Examiner* — Kathleen M Walsh
(74) *Attorney, Agent, or Firm* — Cramer Patent & Design PLLC; Aaron R. Cramer

(57) ABSTRACT

A vehicle electronic display that includes a frame with a center opening, a top wall, and a center portion, a camera attached to the top wall, a rear panel fully covering the rear opening of the frame, and a "U"-shaped stand attached to the rear panel. The frame has a slim profile and a rectangular overall shape that does not impede an operator's view of the vehicle. The camera is integrated with the top wall or the center portion of the frame and is in electrical communication with the on-board power supply of the vehicle, which may be a cigarette lighter adapter, a USB-style plug, or a battery. The rear panel has a "U"-shaped recess that stores the stand when not in use. The frame, rear panel, and stand are made of a resilient and lightweight material capable of being cleaned.

1 Claim, 4 Drawing Sheets

(56) References Cited

U.S. PATENT DOCUMENTS

| | | | | |
|---|---|---|---|---|
| 2004/0239493 | A1* | 12/2004 | Miller | B60Q 1/5035 |
| | | | | 340/471 |
| 2006/0287017 | A1* | 12/2006 | Wu | H04M 1/04 |
| | | | | 455/575.7 |
| 2012/0133591 | A1* | 5/2012 | Simmons | G06F 1/169 |
| | | | | 345/169 |
| 2012/0280924 | A1* | 11/2012 | Kummer | G06F 1/1641 |
| | | | | 345/173 |
| 2013/0285882 | A1* | 10/2013 | Jiang | G06F 3/1446 |
| | | | | 345/1.3 |
| 2014/0077054 | A1* | 3/2014 | Heyen | A47B 23/002 |
| | | | | 248/444 |
| 2014/0159867 | A1* | 6/2014 | Sartee | G08B 5/36 |
| | | | | 340/6.1 |
| 2018/0152550 | A1* | 5/2018 | Dharmatilleke | H04N 23/55 |
| 2018/0304810 | A1* | 10/2018 | Brubaker | B60R 1/00 |
| 2019/0101957 | A1* | 4/2019 | Alexander | G06F 1/1647 |
| 2019/0213931 | A1* | 7/2019 | Brubaker | B60Q 1/2607 |
| 2021/0289645 | A1* | 9/2021 | Wang | H05K 5/0017 |
| 2022/0179432 | A1* | 6/2022 | Nojoumian | H04L 67/12 |
| 2022/0253265 | A1* | 8/2022 | Garg | H04W 4/44 |

\* cited by examiner

VEHICLE ELECTRONIC DISPLAY

RELATED APPLICATIONS

The present invention was first described in and claims the benefit of U.S. Provisional Application No. 63/318,336, filed Mar. 9, 2022, the entire disclosures of which are incorporated herein by reference.

FIELD OF THE INVENTION

The present invention relates generally to an electronic display and more specifically to an electronic display for a vehicle.

BACKGROUND OF THE INVENTION

Vehicles are some of the most important possessions a person can own. They can be mere necessary modes of transportation, or they can be extensions of a person's life. Either way, it is desirable to have a way to communicate to other motorists on the road that isn't just the honking of a horn. With today's technology, there are a myriad of ways to express oneself as a motorist in a vehicle to other motorists that share the road, or to pedestrians, such as in a digitally processed visual display. Often times, a visual display of a nice message can make a difference in someone's life.

Other times, an emergency situation is needed to be communicated and the best way is to provide a visual display. Another benefit is to provide vehicular information to law enforcement or service stations, or to display subscription verification to a dedicated parking lot that is capable of being scanned by a reader. Whatever the reasoning is, a custom visual display that is easily seen by motorists and pedestrians alike is beneficial to all involved. The use of the present invention fulfills this need.

SUMMARY OF THE INVENTION

To achieve the above and other objectives, the present invention provides for a display device with a frame that has a center opening, a top wall, and a center portion, a camera attached to the top wall or center portion, a rear panel fully covering the rear opening of the frame, and a generally "U"-shaped stand attached to the rear panel. The frame has a slim profile, a rectangular overall shape, and does not impede the operator's view of the vehicle. The camera is in electrical communication with the on-board power supply of the vehicle and the rear panel has a "U"-shaped recess that stores the stand when not in use. The display device includes an input port for removable memory storage media, a wireless network adapter, or other forms of removable media, and a plurality of screens and PCBA assemblies that are disposed between the rear panel and the screens, with the screens in electrical communication with the PCBA assemblies. The frame and rear panel are made of a resilient and lightweight material capable of being cleaned.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
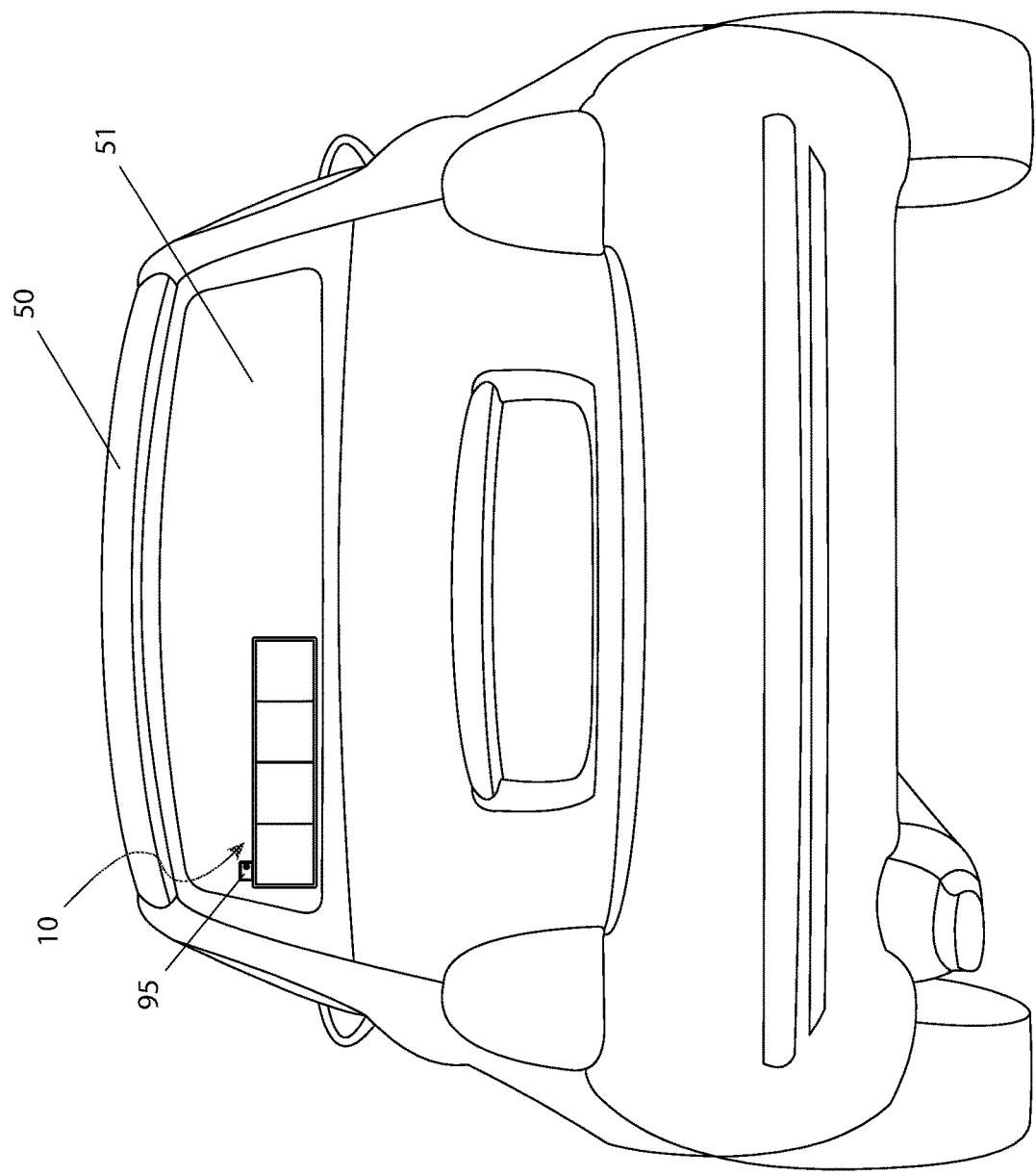
FIG. 1 is an environmental perspective view of a display device as located on a window of a vehicle, according to a preferred embodiment of the present invention.

10 display device
11 frame
12a first screen
12b second screen
12c third screen
12d fourth screen
14 stand
15 rear panel
16 recess
20a first PCBA assembly
20b second PCBA assembly
20c third PCBA assembly
20d fourth PCBA assembly
50 vehicle
51 window
60 power cable
65 input port
70 power supply
75 power bus
80 main controller
85 multiplexer
90 video signals
95 camera

DESCRIPTION OF THE PREFERRED EMBODIMENT

Referring now to FIG. 1, there is shown an environmental view of a display device 10 that is capable of being removably attached to a window 51 of a vehicle 50. In a preferred method of use, the location is an inner surface of a rear window 51 of the vehicle 50 and positioned so as to not restrict a field of vision on an operator of the vehicle 50 during operation thereof. The display device 10 is capable of displaying a pre-programmed, or real-time display to the environment. A camera 95 is located on or integrated with the display device 10.

Figure 2:
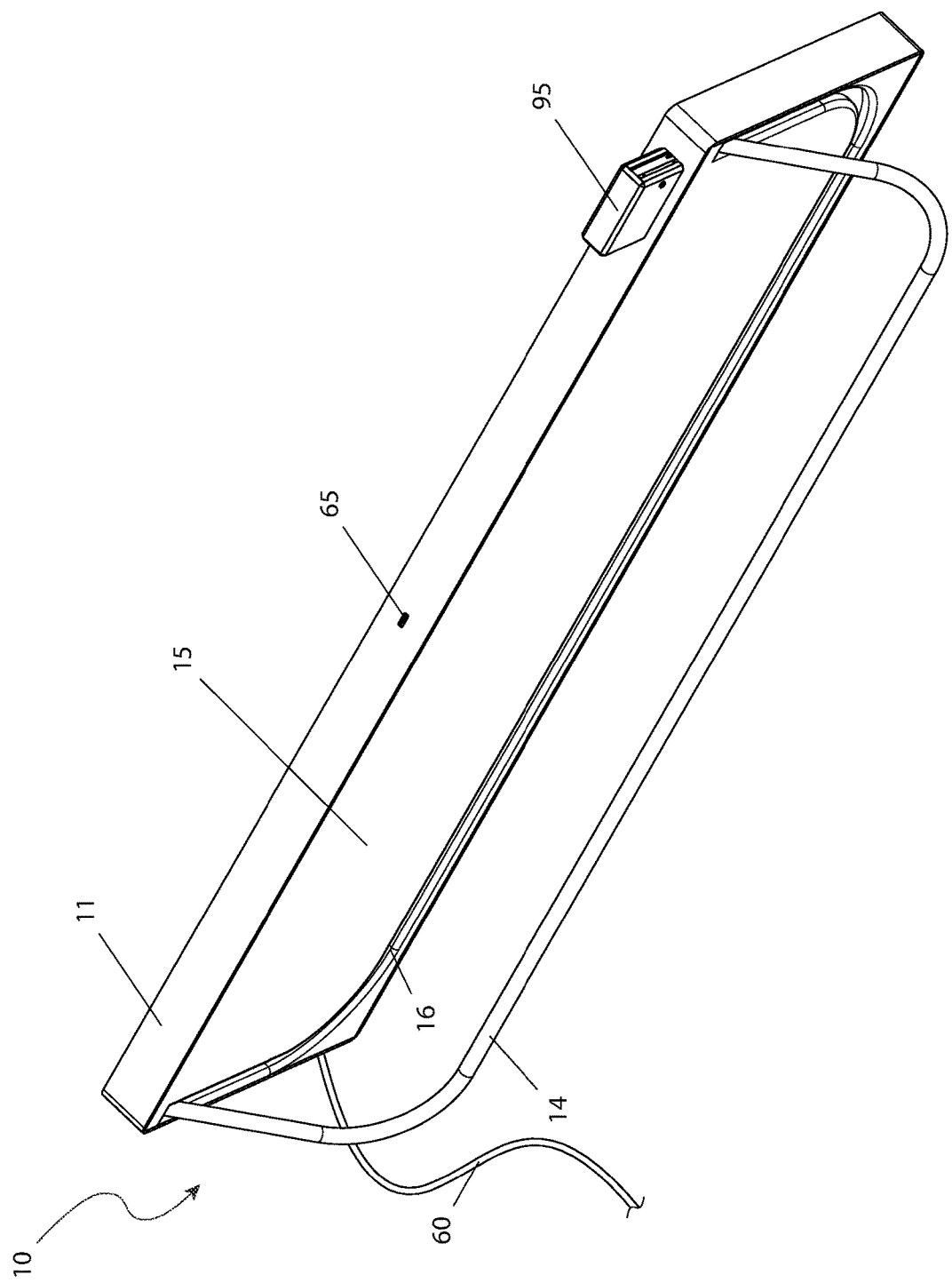
FIG. 2 is a top rear perspective view of a display device, according to the preferred embodiment of the present invention.

FIG. 2 specifically illustrates a rear perspective view of an embodiment of the display device 10. In the exemplary embodiment, the display device 10 comprises a frame 11 that is preferably rectangular in overall shape, with a center opening. It is preferable that the frame 11 maintains a slim profile and does not appreciatively jut out into the interior of the vehicle 50 or in any way impede the view of the operator of the vehicle 50. A camera 95 is attached to or integrated with the top wall of the frame 11. It is appreciated that the camera 95 can be located adjacent either side of the top wall of the frame 11, or in a central location thereof.

A rear panel 15 is attached to the rear perimeter edge of the frame 11 to fully cover the rear opening thereof. The outer surface of the rear panel 15 has a generally "U"-shaped recess 16 that has distal ends at the upper left corner and upper right corner. A generally "U"-shaped stand 14 has distal ends that are pivotally attached to the rear panel 15 within the upper left corner and upper right corner. The recess 16 is capable of storing the stand 14 therein when not in use such that no part of the stand 14 extends rearwardly past the planar outer surface of the rear panel 15. The stand 14 can provide a secondary method of supporting the display device 10. The display device 10 and camera 95 is capable of being electrical communication with an on-board power supply of the vehicle 50 (as shown in FIG. 1) through a power cable 60, such as a cigarette lighter adapter and/or USB-style plugs to convey electricity from the battery of the vehicle 50.

The display device 10 also is capable of receiving data in the form of removable memory storage media, a wireless network adapter, or other forms of removable media that is inserted into an input port 65. Such data can be in the form of a message, an advertisement, or an emergency broadcast. Dimensions for an exemplary embodiment of the display device 10 would be approximately twenty-five inches (25 in.) length, approximately six and one-half inches (36½ in.) in height, and approximately one inch (1 in.) in thickness.

Further, the frame 11 and rear panel 15 are preferably a resilient and lightweight material capable of being cleaned. The frame 11 and rear panel 15 are envisioned to be capable of withstanding elevated temperatures of approximately one hundred twenty degrees Fahrenheit (120° F.). The space between the front opening of the frame 11 and the inner surface of the rear panel 15 houses any interior electrical components required to operate the display device 10. The frame 11, preferably at locations on the front surface thereof, are capable of receiving a connecting feature to enable a corresponding removable mating with a complementary connecting feature to the window 51, (e.g., hook-and-loop-type fasteners, double-sided adhesive tape, etc.).

Figure 3:
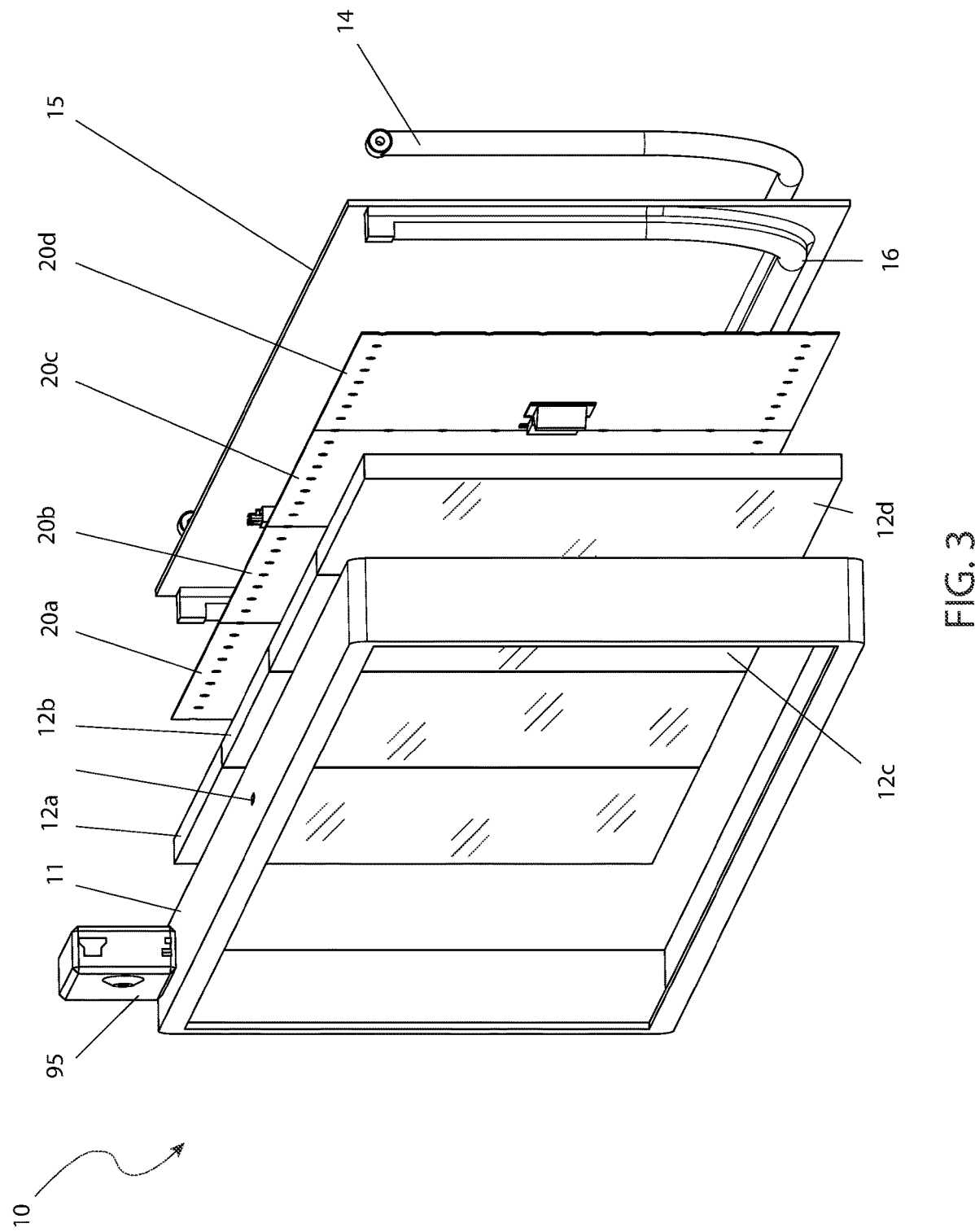
FIG. 3 is a side perspective exploded view of the display device, according to the preferred embodiment of the present invention; and, FIG. 4 is an electrical block diagram of the display device, according to the preferred embodiment of the present invention.

Referring now more closely to FIG. 3, an exploded view of the display device 10 is shown. A first screen 12a, second screen 12b, third screen 12c, and fourth screen 12d are capable of being supported within the frame and secured thereon. The total width of the plurality of screens 12a, 12b, 12c, 12d fully covers the front opening of the frame 11. It is appreciated that any number of screens can be appreciated to fulfill the same function as this exemplary embodiment. It is preferred that the screens 12a, 12b, 12c, 12d do not appreciatively jut out such that removably attaching the display device 10 to the window 51 is affected. The screens 12a, 12b, 12c, 12d have a first side that is capable of transmitting a display viewable through the front opening of the frame 11.

A first PCBA assembly 20a is in electrical communication between a power supply 70 and the first screen 12a and is capable of controlling the desired display thereto. A second PCBA assembly 20b is in electrical communication between the power supply 70 and the second screen 12b and is capable of controlling the desired display thereto. A third PCBA assembly 20c is in electrical communication between the power supply 70 and the third screen 12c and is capable of controlling the desired display thereto. A fourth PCBA assembly 20d is in electrical communication between the power supply 70 and the fourth screen 12d and is capable of controlling the desired display thereto. The desired display can be shared among any of the PCBA assemblies 20a, 20b, 20c, 20d such that any of the screens 12a, 12b, 12c, 12d can be broken into display regions as determined by the desired display. The PCBA assemblies 20a, 20b, 20c, 20d reside in the interstitial space between the rear of the screens 12a, 12b, 12c, 12d and the inner surface of the rear panel 15. The depth of the recess 16 shall not interfere with the PCBA assemblies 20a, 20b, 20c, 20d.

The types of displays that can be displayed may be pre-loaded into the display device 10 or may be programmed into or receive instantaneous instruction like real-time messages as determined by the final user. Such types of displays can be typically greetings, emojis, personalized messages, scannable codes for authorized entry or payment, among other similar styles. The input for programming or mode of input for providing instantaneous instruction can be by microphone, wireless communication with a personal electronic device and/or a dedicated application storing pre-set or purchasable messages, broadcast NOAA-type receivers, remote device pairings, or other similar modes of input.

Figure 4:
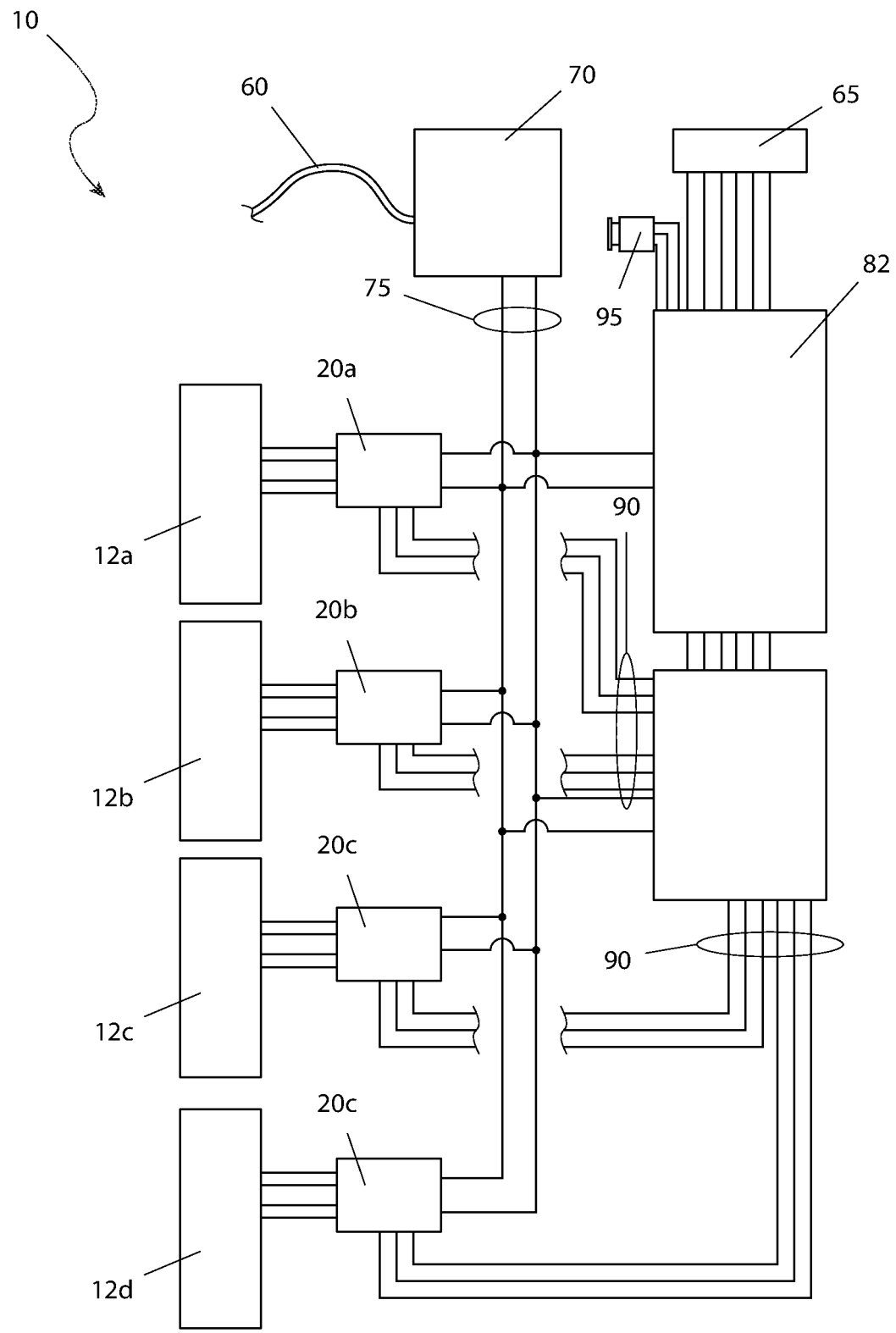

Referring to FIG. 4, an electrical block diagram of the display device 10, according to the preferred embodiment of the present invention is depicted. As aforementioned described, the first screen 12a, the second screen 12b, the third screen 12c, and the fourth screen 12 is electrically connected to the first PCBA assembly 20a, the second PCBA assembly 20b, and the third PCBA assembly 20c, and the fourth PCBA assembly 20d respectively. The power cable 60 routed incoming power to the power supply 70. Resultant output power is then sent along a power bus 75 to the first PCBA assembly 20a, the second PCBA assembly 20b, the third PCBA assembly 20c, the fourth PCBA assembly 20d, a main controller 80 and a multiplexer 85. The main controller 80 receives data from the input port 65 as aforementioned described as a raw image, text, graphic, or the like. Said data is then passed to the multiplexer 85 for coordination before being passed as image signals 90.

The exact specifications, materials used, and method of use may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vehicle electronic display, comprising:
    a frame having a center opening, a top wall, and a center portion;
    a camera attached to the top wall of the frame;
    a rear panel attached to a rear perimeter edge of the frame to fully cover a rear opening of the frame;
    a "U"-shaped stand attached to the rear panel to provide a method of supporting the frame;
    an input port that receives a plurality of data from a removable memory storage media or a wireless network adapter that is inserted into the input port;
    a plurality of Printed Circuit Board Assembly or PCBA assemblies disposed between the rear panel and a plurality of screens; and,
    the plurality of screens supported within a front portion of the frame, the plurality of screens include a first screen, a second screen, a third screen, and a fourth screen;
    wherein the frame is adapted to not prevent an operators view of a vehicle;
    wherein the frame has a slim profile;
    wherein the frame has a rectangular overall shape;

wherein the camera is integrated with the top wall of the frame;

wherein the camera is attached to the center portion of the frame;

wherein the camera is integrated with the center portion of the frame;

wherein the camera is in electrical communication with an on-board power supply of the vehicle;

wherein the on-board power supply of the vehicle is a cigarette lighter adapter to convey electricity from the on-board power supply of the vehicle;

wherein the on-board power supply of the vehicle is a USB-style plug to convey electricity from the on-board power supply of the vehicle;

wherein the on-board power supply of the vehicle is a battery of the vehicle;

wherein a planar outer surface of the rear panel has a "U"-shaped recess that has distal ends at an upper left corner and an upper right corner;

wherein the "U"-shaped recess stores the "U"-shaped stand therein when not in use such that no part of the "U"-shaped stand extends rearwardly past the planar outer surface of the rear panel;

wherein the "U"-shaped stand has a pair of distal ends that are pivotally attached to the rear panel within the upper left corner and the upper right corner;

wherein the frame and the rear panel are made of a resilient and lightweight material capable of being cleaned;

wherein the data is in the form of a message, an advertisement, or an emergency broadcast; and wherein the plurality of screens are in electrical communication with the PCBA assemblies.

* * * * *